United States Patent [19]
Bolner

[11] 3,912,172
[45] Oct. 14, 1975

[54] SELF ACTUATED PRESSURE LUBRICATED SWIVELLED NOZZLE FOR ROCKET MOTORS

[75] Inventor: Thomas E. Bolner, Fayetteville, Tenn.

[73] Assignee: Thiokol Corporation, Bristol, Pa.

[22] Filed: May 7, 1971

[21] Appl. No.: 141,319

[52] U.S. Cl............................ 239/265.35; 60/39.08
[51] Int. Cl........................................... B64c 15/00
[58] Field of Search ...... 239/265.35; 60/39.08, 230, 60/231

[56] References Cited
UNITED STATES PATENTS

| | | | |
|---|---|---|---|
| 3,049,877 | 8/1962 | Sherman................... | 239/265.35 X |
| 3,237,890 | 3/1966 | Thielman................... | 239/265.35 X |
| 3,401,887 | 9/1968 | Sheppard.................... | 239/265.35 |
| 3,659,788 | 5/1972 | Oldfield et al............. | 239/265.35 X |

*Primary Examiner*—Allen N. Knowles
*Assistant Examiner*—Andres Kashnikow
*Attorney, Agent, or Firm*—William R. Wright, Jr.

[57] ABSTRACT

A rocket motor having a thrust vector control swivelled nozzle mounted by means of a ball and socket type swivel joint is provided with a very low friction lubrication system at the joint. The lubricant is pressurized sufficiently to balance the combustion chamber pressure load on the nozzle joint and the lubricant pressure is automatically maintained at the correct balancing amount by a pressure amplifier which applies pressure to the lubricant in response to pressure from the combustion chamber as determined solely by the combustion chamber pressure or by a strain gauge applied to the joint which operates a servo control valve in the combustion chamber to amplifier line. The nozzle is moved to change its thrust vector direction by actuation chambers located within the nozzle joint structure itself and in which pressurized fluid acts within pairs of metal-banded "kidney" seals in which one seal expands to move the nozzle and its opposite seal contracts to allow it to move. An overload bearing insert of low friction material is also provided to prevent high friction metal-to-metal contact in the joint even under unexpectedly sudden or extreme overloads should they occur in the motor.

11 Claims, 10 Drawing Figures from valve 36

SELF ACTUATED PRESSURE LUBRICATED SWIVELLED NOZZLE FOR ROCKET MOTORS

BACKGROUND OF THE INVENTION

One of the most direct ways of changing the direction or attitude of a rocket motor propelled vehicle is to alter the direction of the motor's thrust vector by physical movement of the exhaust nozzle of the rocket motor with respect to the vehicle itself. It is particularly desirable to be able to move the nozzle along without the necessity for moving the entire motor with its attendant mounting problems. Various proposals have been made in the art to provide such movable or swivellable nozzles and to overcome the various problems of friction in the joint and the manner of actuation. The present invention, however, improves upon these by providing a system whereby the pressure of a lubricant in the joint is continually related to the pressure in the combustion chamber of the motor so that the joint is constantly kept in balance as the combustion chamber pressure load on it changes, particularly as it reaches a peak and then declines as propellant is consumed. As a result, the lubricated joint of the present invention is maintained at essentially the same constant low friction coefficient rather than at varying degrees of friction which has often been the case heretofore and which can produce difficulties in jerky nozzle movement, inexact response times, and relatively inaccurate degrees of control of the nozzle and the resultant thrust vector. With the present invention, a smooth movement of the nozzle is permitted throughout the entire period of operation of the motor without increased friction drag or binding at different times in the motor's operating cycle. Also, in combination with the foregoing improvements, the present invention provides an actuating system which acts essentially within the joint itself to move the nozzle with respect to the motor or gas generator, provides a unique seal for this purpose and provides a low friction overload bearing surface.

OBJECTS OF THE INVENTION

Accordingly, it is an object of the present invention to provide an improved lubricated joint of a swivellable nozzle for a rocket motor or gas generator wherein the pressure of the lubricant in the swivel joint is maintained at that pressure which will exactly balance the pressure load from the pressure within the combustion chamber throughout the motor's operating cycle and will either automatically adjust to varying combustion chamber pressure loads or in response to astrain gauge located at the joint.

It is also an object of the present invention to provide an internal actuation mechanism directly within the swivel joint of the motor to preclude the need for external actuators with their additional weight, usually larger space envelope and generally greater complexity.

It is also an object of the present invention to provide an improved seal of unique shape for use in the above-described internal actuation mechanism having a peripheral restraint band which permits expansion and contraction of the seal only in desired directions.

It is also an object of the present invention to provide an extreme overload bearing surface of low-friction material within the swivel joint to allow bearing of the related parts to occur only on it and thus to produce minimal friction under extreme overload conditions in the event that the lubricant pressure should fail or be overcome by some unexpected or unusually severe load.

Other objects and advantages of the present invention will become apparent from the detailed description of a preferred embodiment contained in the specification and from the claims which follow.

DESCRIPTION OF THE INVENTION

Figure 1:
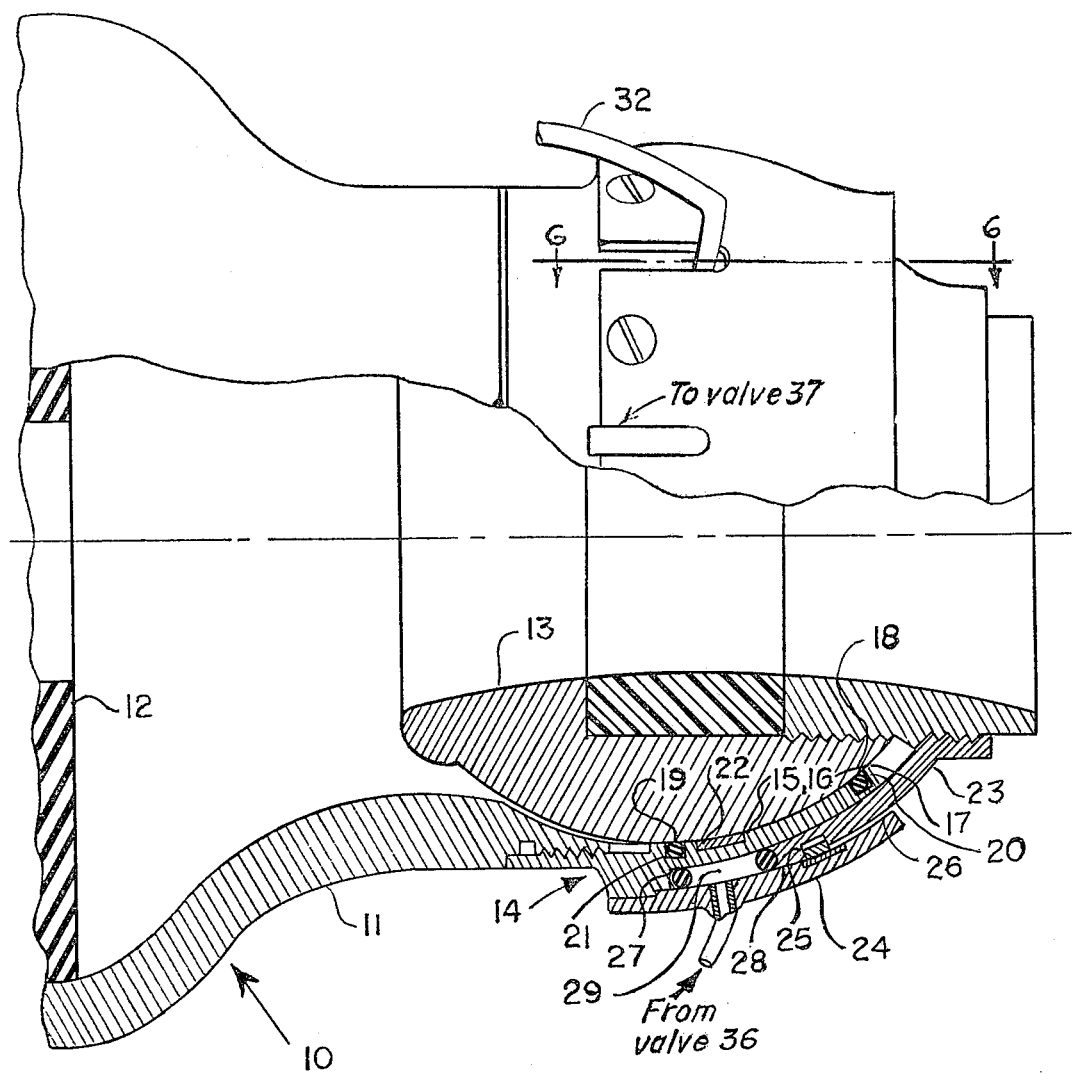
FIG. 1 is a partial longitudinal sectional view of a rocket motor including a portion of its case and its swivellable exhaust nozzle.
Figure 2:
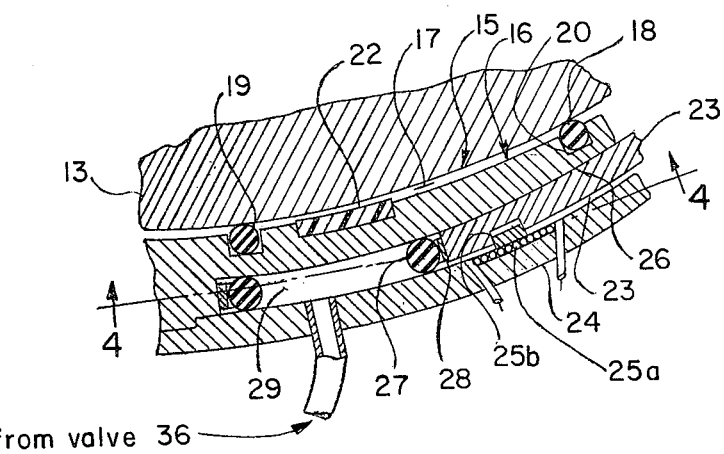
FIG. 2 is an enlarged cross-sectional view of a portion of the swivel joint showing the details of the lubrication chamber, overload bearing surface, internal actuation mechanism, and actuation position feed back potentiometer.
Figure 3:
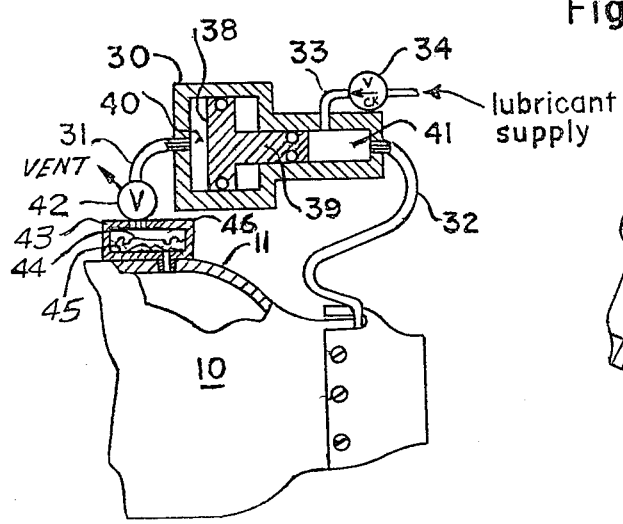
FIG. 3 is a semi-schematic view showing the combustion chamber detector, pressure amplifier, axial position control valve and the various connections thereto.
Figure 6:
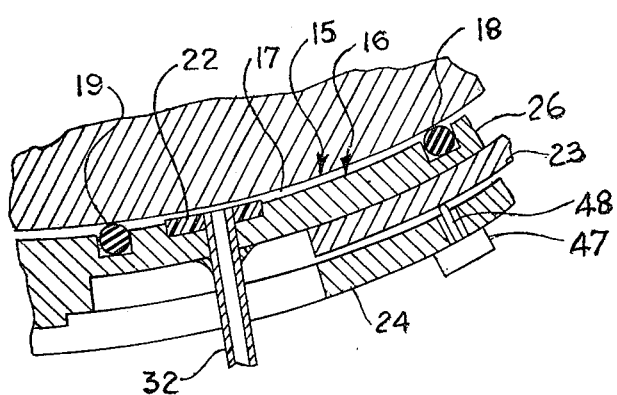
FIG. 6 is a partially cross sectional view of a portion the swivel joint showing the lubricant inlet to the lubrication chamber in the swivel joint and the strain gauge.

In a preferred embodiment of the present invention and with particular reference to FIG. 1, a solid propellant rocket motor designated generally as numeral 10 is shown having a case 11, a solid propellant 12, and an exhaust nozzle 13 mounted on case 11 by means of a ball and socket type swivel joint designated generally by numeral 14 including a rounded nozzle surface or "ball" 15 and a mating internally rounded surface or "socket" 16. Surfaces 15, 16 are concentric but surface 16 is of a slightly larger diameter in order to form a lubrication chamber or interstice 17 which is annular in form and is fully sealed and enclosed at its extremities by annular seals 18, 19 which may be semi-resilient O-rings or the like and which are restrained from excessive motion or extrusion into the interstice 17 by grooves or channels 20, 21, respectively. An annular ring 22 preferably made of tetrafluoroethylene, polytetrafluoroethylene, hexafluoropropylene or another material having similar low friction qualities is set in the face of the socket 16 extending slightly above the surface of 16 in the manner shown in the enlarged view of this area in FIG. 2. The annular dished surface 15 bears only on seals 18, 19 and cannot touch ring 22 unless the seals 18, 19 are compressed more than they would be under a normal load in which case surface 15 bears only on low friction ring 22 and high friction metal-to-metal contact is avoided. As shown in FIGS. 3 and 6, a lubricant supply pipe 32 carries lubricant to the lubrication chamber of interstice 17 from a pressure amplifier 30 which is described later in this specification.

Figure 4:
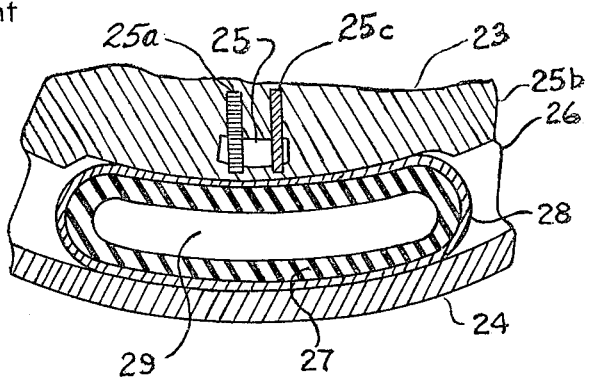
FIG. 4 is a sectional plan view taken on lines 4—4 showing one actuation chamber including the seal and its surrounding continuous band, and portions of the actuation feed back potentiometer pertinent to said actuation chamber.

A "self actuation" or internal actuation system is also included in the present invention and includes a plurality (usually four) of expansible and identical chambers 29, 29a, 29b and 29c. Chamber 29 is defined by fixed wall 24, 26 and movable or slidable wall 23 as will be seen in FIGS. 1, 2 and 4. Included within chamber 29 is a closed loop seal 27 which is shaped into an arcuate form resembling a kidney or the like in plan form (as shown in FIG. 4) and is round in cross section. A continuous flat tension band 28 of stainless steel, glass or other fibers held together by a binder, or the like is wrapped around the plan form periphery of seal 27 between it and its surrounding walls 23, 24 and 26 in the manner shown in FIG. 4. Band 28 is not closely restrained laterally but as shown in FIG. 2, clearance is provided between its edges and walls 24 and 26 so that there will be no interference with either the action of seal 27 or the actuation position feed back potentiometers 25.

Figure 5:
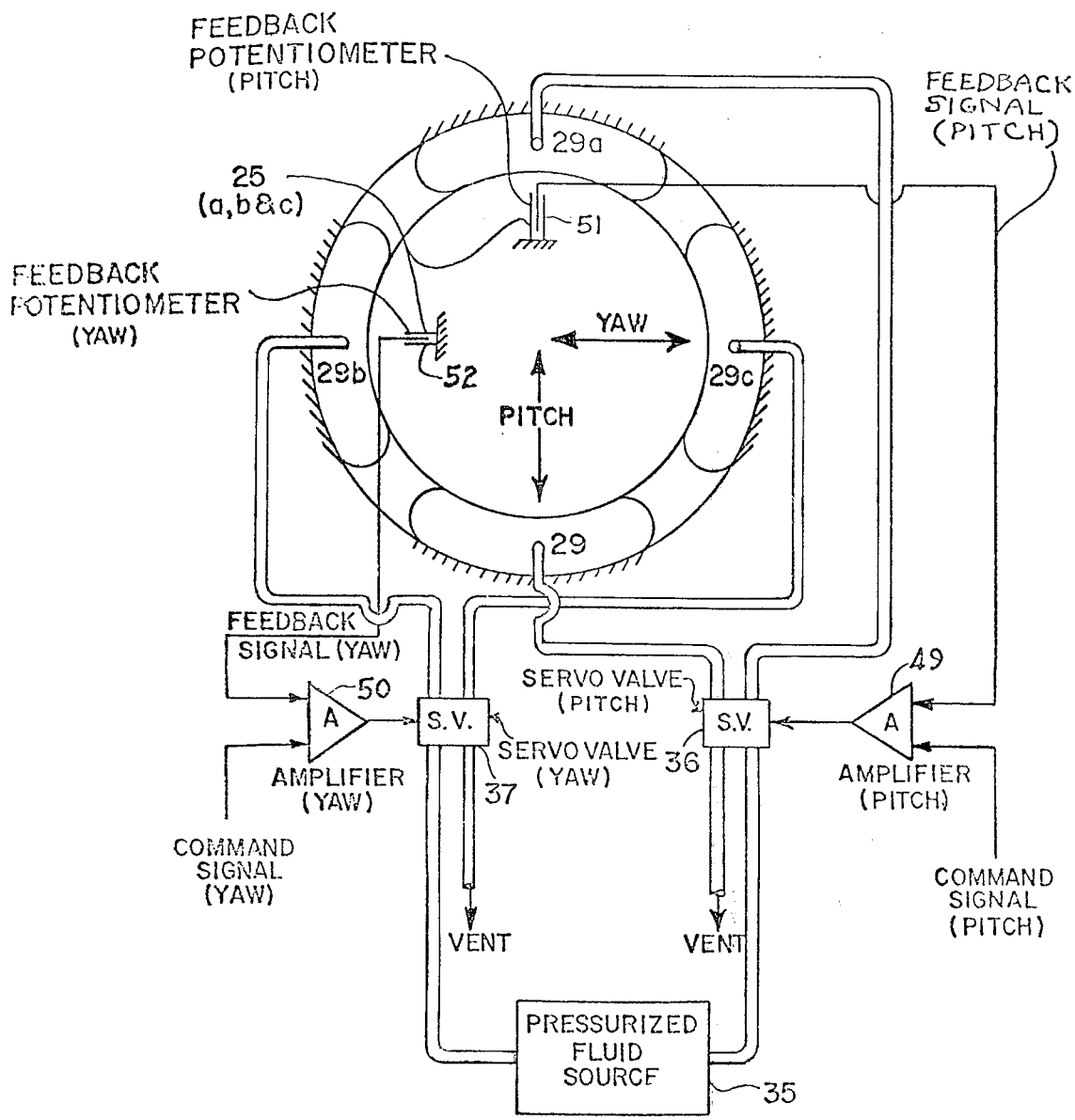
FIG. 5 is a diagrammatic and schematic view of the nozzle actuating chambers and showing the fluid and electrical connections thereto.

As mentioned previously in this specification, there are four actuation chambers 29, 29a, 29b and 29c which are located with their center line 90° apart as shown diagrammatically in FIG. 5 and which act is diametrically opposed pairs with one chamber expanding while the other contracts as the nozzle moves. Each pair is operated independently of the other pair with 29, 29a controlling the vertical sweep or pitch of the nozzle and 29b, 29c controlling the horizontal sweep or yaw. However, even though their operation is independent, their movements can be controlled in such a manner that the nozzle direction can be swept universally through a full 360° circular area at its outer end as defined by the structural limits of the nozzle mechanism.

The kidney seal 27 will expand along its minor axis and contract along its major axis as pressure is applied to its inner periphery because the steel band 28 keeps the outer periphery of the seal 27 constant at all times. It allows expansion of the seal 27 laterally (along its minor axis) and at the same restrains it along its longitudinal axis and actually shortens its longitudinal dimension.

A pressurized fluid supply system for the actuation system is also shown in FIG. 5 in which pressurized fluid such as Type A automotive hydraulic fluid is supplied from pressurized fluid source or tank 35 through suitable conduits to servo valves 36, 37 from which it is selectively distributed from valve 36 to chambers 29 or 29a and from valve 37 to chambers 29b or 29c. Valves 36 and 37 are provided with passages which in one position provide communication from the fluid source 35 to a chamber and from its opposing chamber to a vent to the atmosphere and in a second position reverses this communication. In addition, these valves 36, 37 are of the servo type so that the flow to and from the chambers is controlled and thus the extent and rate of movement of the nozzle is also controlled.

The ball and socket swivel joint chamber of interstice 17 is filled with lubricant as the nozzle joint is assembled and any trapped air is removed at that time. Connection is then made through conduit 32 to amplifier chamber 41 and thence to conduit 33 back to the lubricant supply through check valve 34 as shown in FIG. 3. The lubricant is sealed and retained in chamber or interstice 17 by seals, 18, 19 and by check valve 34 in the lubricant supply conduit if that conduit is exposed at the time to the lubricant through its connection to the pressure amplifier 30 and by the movement of piston 39 thereof.

Figure 7:
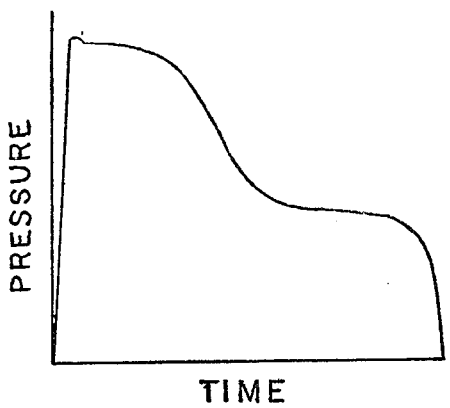
FIG. 7 is a graph of a typical time-pressure curve for a solid propellant rocket motor.

When combustion commences in the combustion chamber of motor 10 by the ignition of propellant 12, the combustion chamber pressure rises as hot gases are produced as shown typically in the chart in FIG. 7. A portion of these pressurized gases passes into fluid reservoir 43 entering chamber 45 and exerting pressure on diaphragm 44 which in turn exerts pressure on hydraulic fluid contained in chamber 46. This pressurized fluid then passes from chamber 46 through valve 42, through conduit 31 into chamber 40 of pressure amplifier 30 and exerts its pressure upon piston 38 which in turn moves attached piston 39 into chamber 41 to exert pressure upon the lubricant contained therein. Since piston 38 is of larger diameter than piston 39, the pressure of the lubricant becomes amplified with respect to the combustion chamber pressure. As this occurs, lubricant from chamber 41 passes through conduit 32 into the sealed space or interstice 17, the pressure in joint 14 also increases, and, because of the sizing of the amplifier 30 parts based on design considerations, this pressure is sufficient to just balance the pressure load exerted on the nozzle joint by the combustion chamber pressure as it acts upon the projected area of the movable nozzle. Ordinarily, the pressure of the lubricant will be considerably higher than that of the combustion chamber pressure and the pressure amplifier 30 provides this amplified pressure.

Since the lubrication pressure now is in balance with the pressure load on the nozzle joint, it will be seen that the friction on the joint will be slight and comprises only the light load on the O-ring seals 18, 19 and the small friction inherent in the lubricant and therefore will have very little resistance to movement. Also, the joint will not tend to bind initially but will move smoothly throughout its range with only very slight starting or "break loose" friction. As a result, movement of the nozzle is smoother with almost negligible drag and little or no sticking or binding and this is the case even though the combustion chamber pressure fluctuates as shown typically in FIG. 7 since the amplifier causes an immediate corresponding increase or decrease in the lubricant pressure to bring it to the proper amount. The preferred lubricant is a fluorocarbon-based oil or light grease or any other lubricant which will flow and retain its lubricating properties under the extreme temperature conditions experienced in the motor and its expected environment.

Figure 8:
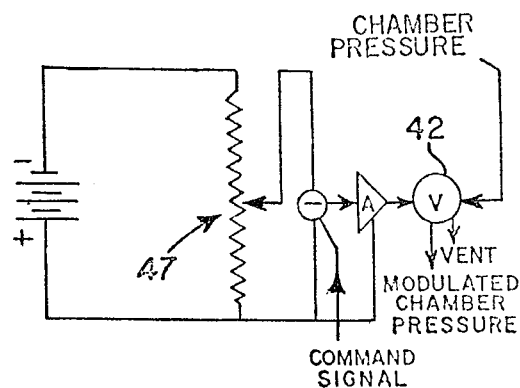
FIG. 8 is a schematic diagram showing the axial position feed back strain gauge potentiometer and its associated electrical circuit and valve.
Figure 9:
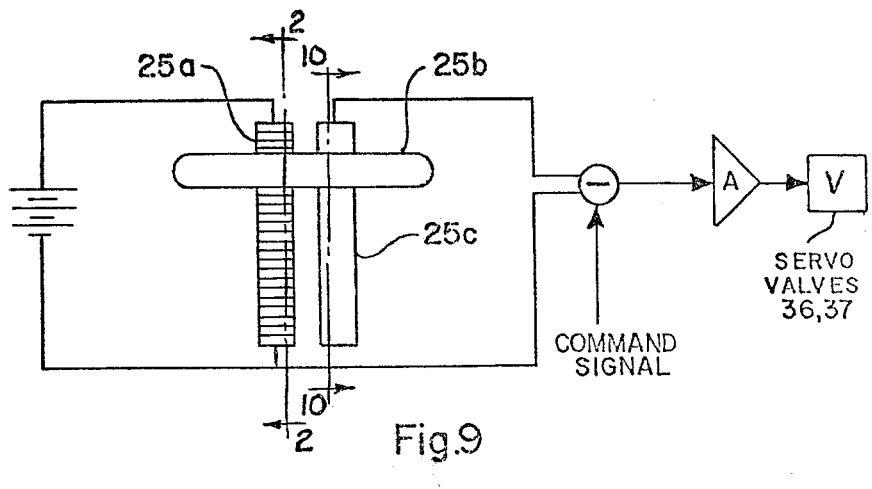
FIG. 9 is a schematic diagram showing the actuators' position feed back potentiometer's associated electrical circuit and valves.
Figure 10:
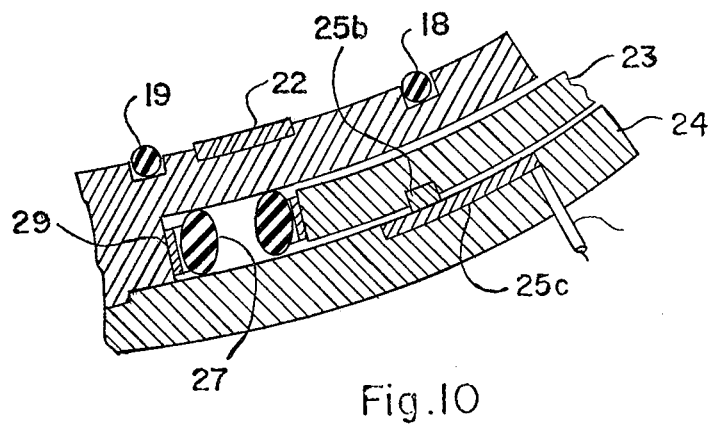
FIG. 10 is a cross section of a portion of the swivel joint taken through the solid bar of an actuation potentiometer as indicated by lines 10—10 of FIG. 9.

As shown in FIGS. 6 and 8, a strain gauge 47 of the potentiometer type is also provided to detect changes in the gap or width of interstice 17 and to transmit this information to servo valve 42 in FIG. 3 which then responds to admit or shut off flow of pressurized fluid from the fluid chamber 46 of reservoir or accumulator 43 to chamber 40 of amplifier 30. This action can be employed as a secondary or "back up" system for the system previously described and should exhibit a high degree of quick and accurate response to changes in the nozzle load. In operation, as the width of the interstice or gap decreases or increases due to imbalance of the pressure load, pin 48 moves slightly into or out of potentiometer gauge 47 changing its resistance slightly and causing servo valve 42 to operate to increase or decrease the pressure of the pressurized fluid accordingly as the electrical signal is varied.

As will be seen in FIG. 3, accumulator 43 includes flexible diaphragm 44 which separates chambers 45 and 46, chamber 45 being filled with pressurized gas from the combustion chamber and chamber 46 with hydraulic fluid.

The nozzle movement necessary to change the thrust vector direction to steer the vehicle which the motor is propelling is controlled from a course direction programmer (not shown) or a similar automatic or manual means. In any event, command signals for yaw and pitch control are fed into electrically-operated servo valves 36, 37 which allow pressurized hydraulic fluid to flow to, or be vented from, the expansion chambers 29, 29a, 29b and 29c. A feed back electrical signal is also provided in order to give information to the electronic control as to the position of the nozzle in pitch, yaw or in any combination thereof. When a command signal is given to alter the direction of the thrust vector in pitch, for instance, this electrical signal enters amplifier 49 where it is amplified in strength sufficiently to operate servo valve 36 causing it to allow pressurized fluid to flow from the pressurized fluid source 35 through valve 36 into expansion chamber 29 and allowing fluid from opposing chamber 29a to flow back through valve 36 to a vent either overboard or through a return to the fluid source 35. As this occurs, chamber 29 expands as its internal pressure increases and the internal pressure of chamber 29a decreases thus causing member 23 and nozzle 13 to move in a counter clockwise direction in FIG. 1. This action causes feed back potentiometer 51 to send an electrical signal back to amplifier 49 where it is compared with the command signal and a determination is made automatically as to whether the servo valve 36 must continue to operate, stop or reverse its operation to give the desired nozzle and resultant thrust vector direction. Similarly, for yaw control, a yaw command signal is fed into amplifier 50 where it is amplified and sent into servo valve 37 which operates to allow pressurized fluid to flow from source 35 into chamber 29b and to allow fluid to flow out of chamber 29c to produce nozzle swivelling in yaw, with feed back potentiometer 52 detecting the extent of the movement and sending its signal back to amplifier 50 where it is compared with the yaw command signal and the servo valve 37 adjusted accordingly in the same manner as for the pitch control. It will be seen that the yaw and pitch control action can also be operated simultaneously to produce a combined action whereby the nozzle and its resultant thrust vector is directed in both yaw and pitch to produce a steering effect in any direction within the limits of the structure of the swivelling nozzle.

It will also be seen that the nozzle can be swivelled in the opposite directions in both pitch and yaw by reversing the flow of pressurized fluid through the pitch and yaw systems and thus expanding and contracting those chambers opposite to those used in the operations just described and with the extent of movement again determined by the feed back potentiometer signals.

While there have been shown and described and pointed out the fundamental novel features of the invention as applied to a preferred embodiment, it will be understood that various ommissions and substitutions and changes in the form and details of the device illustrated and in its operation may be made by those skilled in the art, without departing from the spirit of the invention. It is the intention, therefore to be limited only as indicated by the scope of the following claims.

I claim:

1. An improved lubricated ball and socket swivel joint for the attachment of a steerable exhaust nozzle to the combustion chamber of a rocket motor including, in combination, a lubricant pressure amplifier communicably connected to the combustion chamber and responsive to the pressure therein, means communicably connecting the amplifier to sealed spaced between the ball and socket of the swivel joint, means supplying lubricant to said amplifier, and means for universally swivelling said nozzle including a plurality of actuation expansion chambers between movable and fixed portions of said swivel joint and contained within the joint, a continuous resilient peripheral seal within each expansion chamber, a constant length flexible tension band about and in contact with the perimeter of each seal, and means for selective application of fluid pressure to the chambers.

2. The invention set forth in claim 1 with the seals each in the form of a kidney in plan form.

3. The invention set forth in claim 1 with the tension band made of metal.

4. The invention set forth in claim 1 with the tension band made of fibers held together with a binder.

5. The invention set forth in claim 1 with four expansion chambers diametrically opposed in pairs and said last-named means including a source of pressurized fluid, a valve for each pair of chambers and selectively communicably connected to said source of pressurized fluid, to each of said chambers and to a vent, and means for operating each valve to selectively pressurize or vent the chambers in its associated pair.

6. The invention set forth in claim 3 with the tension band made of stainless steel.

7. An improved lubricated ball and socket swivel joint for the attachment of a steerable exhaust nozzle to the combustion chamber of a rocket motor including, in combination, a lubricant pressure amplifier communicably connected to the combustion chamber and responsive to the pressure therein, means communicably connecting the amplifier to sealed space between the ball and socket of the swivel joint, means supplying lubricant to said amplifier, means for universally swivelling said nozzle, a strain gage adapted to respond to changes in the gap between the ball and socket and means responsive thereto to vary the lubricant pressure accordingly to balance the pressure loads on the swivel joint.

8. The invention set forth in claim 7 with the strain gauge comprising an electrical potentionmeter.

9. The invention set forth in claim 7 with an electrically operated servo valve in communicable connection between the combustion chamber and the amplifier and said servo valve responsive to the strain gauge and adapted to control the extent of the pressure to the amplifier.

10. An improved lubricated ball and socket swivel joint for the attachment of a steerable exhaust nozzle to the combustion chamber of a rocket motor including, in combination, a lubricant pressure amplifier communicably connected to the combustion chamber and responsive to the pressure therein, means communicably connecting the amplifier to sealed space between the ball and socket of the swivel joint, means supplying lubricant to said amplifier, means for universally swivelling said nozzle, and a low friction coefficient seal between the ball and socket and set in the socket and protruding above it but not touching the ball except during overload conditions.

11. The invention set forth in claim 10 with the seal made of material selected from the group comprising tetrafluoroethylene, polytetrafluoroethylene or hexafluoropropylene.

* * * * *